(12) United States Patent
Orsley

(10) Patent No.: US 7,978,175 B2
(45) Date of Patent: Jul. 12, 2011

(54) MAGNETIC RE-CENTERING MECHANISM FOR A CAPACITIVE INPUT DEVICE

(75) Inventor: Timothy James Orsley, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 862 days.

(21) Appl. No.: 11/944,506

(22) Filed: Nov. 23, 2007

(65) Prior Publication Data

US 2009/0135136 A1    May 28, 2009

(51) Int. Cl.
*G06F 3/033* (2006.01)
(52) U.S. Cl. ......................................................... 345/157
(58) Field of Classification Search .................. 345/156, 345/157, 159, 160, 161, 184
See application file for complete search history.

(56) References Cited

U.S. PATENT DOCUMENTS

| | | |
|---|---|---|
| 3,700,905 A | 10/1972 | Parkin et al. |
| 3,973,270 A | 8/1976 | Schroder et al. |
| 3,987,685 A | 10/1976 | Opocensky |
| 4,670,743 A | 6/1987 | Zemke |
| 4,719,455 A | 1/1988 | Louis |
| 5,006,952 A | 4/1991 | Thomas |
| 5,056,146 A | 10/1991 | Nishide |
| 5,086,296 A | 2/1992 | Clark |
| 5,134,887 A | 8/1992 | Bell |
| 5,191,971 A | 3/1993 | Hakkarainen et al. |
| 5,252,952 A | 10/1993 | Frank et al. |
| 5,263,134 A | 11/1993 | Paal |
| 5,305,017 A | 4/1994 | Gerpheide |
| 5,343,765 A | 9/1994 | Okada |
| 5,421,694 A | 6/1995 | Baker et al. |
| 5,504,502 A * | 4/1996 | Arita et al. ..................... 345/160 |
| 5,515,044 A | 5/1996 | Glatt |
| 5,615,083 A | 3/1997 | Barnett |
| 5,659,334 A | 8/1997 | Yaniger et al. |
| 5,703,356 A | 12/1997 | Bidiville et al. |
| 5,704,037 A | 12/1997 | Chen |
| 5,739,821 A | 4/1998 | Ho |
| 5,808,603 A | 9/1998 | Chen |
| 5,815,139 A | 9/1998 | Yoshikawa et al. |
| 5,874,956 A | 2/1999 | LaHood |
| 5,883,690 A | 3/1999 | Meyers et al. |

(Continued)

FOREIGN PATENT DOCUMENTS

DE    4033465    5/1991
(Continued)

OTHER PUBLICATIONS

"ARS Technica, iPod nano", http://arstechnica.com/reviews/ardware/nano.ars/4,, (1998).

(Continued)

*Primary Examiner* — Richard Hjerpe
*Assistant Examiner* — Jeffrey Parker

(57) ABSTRACT

Various embodiments provide an enhanced mobile computing experience by providing an input device in a mobile electronic device that is configured to accurately and quickly re-center a button or other user interface while providing a sensation of enhanced tactile feedback to a user. The biasing force of a magnetic re-centering mechanism is employed to overcome frictional forces acting on the button during its travel forwards and backwards and tilting to insure that the button is returned quickly and accurately to a resting position. The magnetic re-centering mechanism has a low profile, and permits the input device and the mobile electronic device within which the input device is disposed to have small form factors.

25 Claims, 8 Drawing Sheets

U.S. PATENT DOCUMENTS

| | | | |
|---|---|---|---|
| 5,889,507 | A | 3/1999 | Engle et al. |
| 5,914,465 | A | 6/1999 | Allen |
| 5,949,354 | A | 9/1999 | Chang |
| 5,956,016 | A | 9/1999 | Kuenzner et al. |
| 6,115,030 | A | 9/2000 | Berstin et al. |
| 6,198,473 | B1 | 3/2001 | Armstrong |
| 6,256,012 | B1 | 7/2001 | Devolpi |
| 6,288,707 | B1 | 9/2001 | Philipp |
| 6,292,174 | B1 | 9/2001 | Mallett et al. |
| 6,326,948 | B1 | 12/2001 | Kobachi et al. |
| 6,430,023 | B1 | 8/2002 | Suzuki |
| 6,489,950 | B1 | 12/2002 | Griffin et al. |
| 6,492,911 | B1 | 12/2002 | Netzer |
| 6,525,713 | B1 | 2/2003 | Soeta et al. |
| 6,530,283 | B2 | 3/2003 | Okada et al. |
| 6,646,631 | B2 | 11/2003 | Suzuki et al. |
| 6,667,733 | B2 | 12/2003 | Miyoshi |
| 6,730,863 | B1 | 5/2004 | Gerpheide et al. |
| 6,753,848 | B2 | 6/2004 | Toshiharu |
| 6,762,748 | B2 | 7/2004 | Maatta et al. |
| 6,816,148 | B2 | 11/2004 | Mallett et al. |
| 6,816,154 | B2 | 11/2004 | Wong et al. |
| 6,961,052 | B1 | 11/2005 | Vaziri |
| 7,019,765 | B2 | 3/2006 | Fujiwara et al. |
| 7,042,441 | B2 | 5/2006 | Adams et al. |
| 7,046,230 | B2 | 5/2006 | Zadesky et al. |
| 7,123,028 | B2 | 10/2006 | Okada et al. |
| 7,158,115 | B2 | 1/2007 | Harley et al. |
| 7,429,976 | B2 * | 9/2008 | Harley et al. ............... 345/157 |
| 7,639,234 | B2 * | 12/2009 | Orsley ............................ 345/156 |
| 7,733,333 | B2 | 6/2010 | Kaliher |
| 7,889,176 | B2 * | 2/2011 | Harley et al. ............... 345/157 |
| 2002/0093328 | A1 | 7/2002 | Maatta et al. |
| 2002/0163547 | A1 | 11/2002 | Abramson et al. |
| 2003/0025679 | A1 | 2/2003 | Taylor et al. |
| 2003/0048250 | A1 | 3/2003 | Boon et al. |
| 2003/0048262 | A1 | 3/2003 | Wu et al. |
| 2003/0076301 | A1 | 4/2003 | Tsuk et al. |
| 2003/0095096 | A1 | 5/2003 | Robbin et al. |
| 2004/0108993 | A1 | 6/2004 | Suzuki et al. |
| 2005/0052425 | A1 | 3/2005 | Zadesky et al. |
| 2005/0052426 | A1 | 3/2005 | Hagermoser et al. |
| 2005/0052429 | A1 | 3/2005 | Philipp |
| 2005/0062732 | A1 | 3/2005 | Sinclair et al. |
| 2005/0110755 | A1 * | 5/2005 | Harley et al. ............... 345/160 |
| 2006/0001657 | A1 | 1/2006 | Monney et al. |
| 2006/0016800 | A1 | 1/2006 | Paradiso et al. |
| 2006/0033721 | A1 | 2/2006 | Woolley et al. |
| 2006/0038783 | A1 | 2/2006 | Shaw et al. |
| 2006/0161870 | A1 | 7/2006 | Hotelling et al. |
| 2006/0176270 | A1 | 8/2006 | Sachs |
| 2006/0192754 | A1 | 8/2006 | Sachs et al. |
| 2006/0202971 | A1 | 9/2006 | Kaliher |
| 2006/0267933 | A1 * | 11/2006 | Tai et al. ..................... 345/157 |
| 2006/0290665 | A1 * | 12/2006 | Matta et al. ................. 345/157 |
| 2007/0052691 | A1 | 3/2007 | Zadesky et al. |
| 2007/0115263 | A1 | 5/2007 | Taylor et al. |
| 2007/0247421 | A1 | 10/2007 | Orsley |
| 2007/0247446 | A1 * | 10/2007 | Orsley et al. ............... 345/184 |
| 2008/0088600 | A1 | 4/2008 | Prest et al. |
| 2008/0164076 | A1 * | 7/2008 | Orsley ....................... 178/18.01 |
| 2008/0237766 | A1 | 10/2008 | Kim |
| 2008/0283310 | A1 | 11/2008 | Moore |
| 2008/0284742 | A1 | 11/2008 | Prest et al. |
| 2009/0057124 | A1 * | 3/2009 | Orsley et al. ................. 200/600 |

FOREIGN PATENT DOCUMENTS

| | | |
|---|---|---|
| DE | 10309011 | 9/2004 |
| EP | 1136939 | 9/2001 |
| GB | 2247938 | 3/1992 |
| JP | 2222019 | 9/1990 |
| JP | 7-49325 | 2/1995 |
| JP | 2000/357049 | 12/2000 |
| JP | 2001-255996 | 9/2001 |
| JP | 2001/312363 | 11/2001 |
| JP | 2003/84916 | 3/2003 |
| WO | WO-00/51358 | 8/2000 |
| WO | WO-02/03317 | 1/2002 |
| WO | WO-03/030092 | 4/2003 |
| WO | WO-2006/031332 | 3/2006 |

OTHER PUBLICATIONS

Motorola SLVR description, unknown author and date; from www.motorola.com/motoinfo/product/details.jsp?globalObjectID=86.

Panasonic Tactile sheet; Type ESP: unknown author and date.

Avago Technologies AMRI-2000 Data Sheet; unknown author and date.

Avago Technologies AMRI-2000-P000 Data Sheet; unknown author and date.

3M Double Coated Tapes, 9731 9731RW, Technical Data, Feb. 2005: unknown author.

U.S. Appl. No. 11/606,556, filed Nov. 30, 2006, Harley.

U.S. Appl. No. 60/794,723, filed Apr. 25, 2006, Harley.

U.S. Appl. No. 10/723,957, filed Nov. 24, 2003, Harley.

U.S. Appl. No. 11/407,274, filed Apr. 19, 2006, Orsley.

U.S. Appl. No. 11/923,653, filed Oct. 25, 2007, Orsley.

* cited by examiner

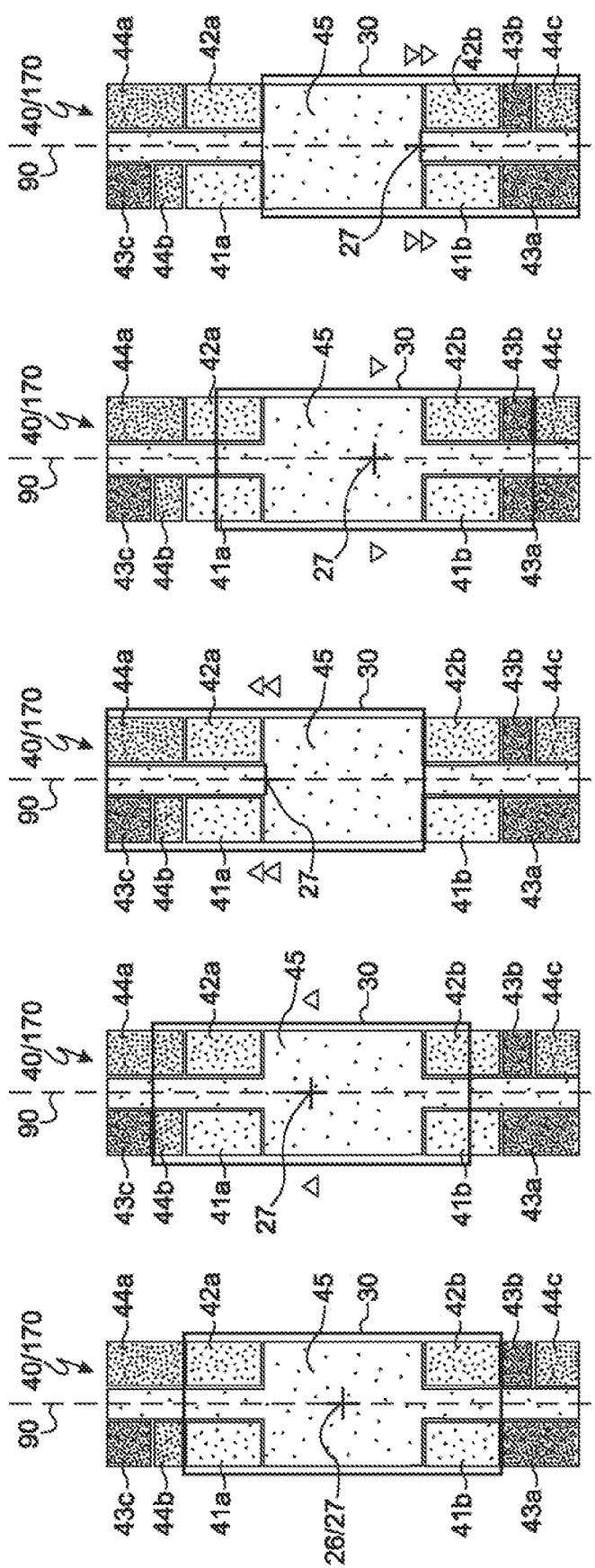
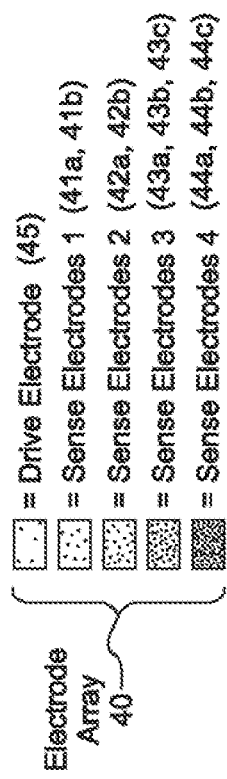

MAGNETIC RE-CENTERING MECHANISM FOR A CAPACITIVE INPUT DEVICE

FIELD OF THE INVENTION

Various embodiments relate to the field of input deices generally, and in some embodiments to input devices for portable or hand-held devices such as pointing devices, mice, cell phones, MP3 players, personal computers, game controllers, laptop computers, PDAs and the like. Embodiments include those finding application in stationary, portable and hand-held devices, as well as those related to the fields of industrial controls, washing machines, exercise equipment, and other devices.

BACKGROUND

The optical mouse has been popular for controlling functions of computers and other electronic devices. The conventional optical mouse is too big and unsuitable for use in many portable electronic devices, however, such as personal digital assistants, telephones, and the like. Accordingly, other types of conventional input devices such as TOUCHPAD™ and THINPAD™ devices, and LOGITECH™ REVOLUTION™ mice, have been developed for use in portable electronic devices such as laptop computers, phones and the like. These input devices have become more important as portable electronic devices continue to incorporate additional functionality, such as electronic mail, wireless computing, photography and so on.

Conventional puck-based input devices are attractive for handheld electronic devices because of their low profile. In some conventional puck-based input devices, a resilient mechanism, such as a spring, is deployed in association with the puck to maintain a desired position of the puck. The resilient mechanism is arranged to bias the puck to return to a center position after the puck has been moved to an off-center position, in which the user captures a user input. Unfortunately, such mechanisms are subject to mechanical wear and tear over time, and susceptible to the ingress of debris and moisture potentially resulting in device failure. In rate control devices such as the IBM™ TRACKPOINT™ the position of the stick maps to the velocity of the cursor. For rate control devices, accurate re-centering is important because if the puck is not returned precisely to center, the cursor may drift when the user is not touching it. To work around this problem, these conventional input devices typically employ a sufficiently large central "dead zone," or use a very stiff restoring spring, both of which are detrimental to a good user experience. The NEUROPOINTER™ by NEC™ is an example of a conventional portable puck-based navigation device which uses a rubber membrane to re-center the puck. Because the membrane is essentially a linear spring, the re-centering accuracy is relatively poor.

Other conventional input devices attempt to address the accuracy of re-centering a puck with re-centering mechanisms having alternative force restoring force profiles. Unfortunately, these conventional input devices are too thick to fit in many portable electronic devices.

Users continue to demand more precision and accuracy in user input devices of portable electronic devices, while designers face continual pressure toward increasing miniaturization and increased functionality. Faced with these challenges, conventional input devices often fall short of market expectations by exhibiting inaccurate puck centering and positioning.

Further details concerning various aspects of prior art devices and methods are set forth in: (1) U.S. patent application Ser. No. 11/606,556 entitled "Linear Positioning Input Device" to Harley filed Nov. 30, 2006; (2) U.S. Provisional Patent Application Ser. No. 60/794,723 entitled "Linear Positioning Device" to Harley filed Apr. 25, 2006; (3) U.S. patent application Ser. No. 10/723,957 entitled "Compact Pointing Device" to Harley filed Nov. 24, 2003; (4) U.S. patent application Ser. No. 11/407,274 entitled Re-Centering Mechanism for an Input Device" to Orsley filed Apr. 19, 2006; (5) U.S. patent application Ser. No. 11/923,653 entitled "Control and Data Entry Apparatus" to Orsley filed Oct. 25, 2007, each of which is hereby incorporated by reference herein, each in its respective entirety.

What is need is a capacitive sensing input device that is capable of re-centering itself accurately and quickly, may be re-centered from both slide and tilt positions, has a small form factor, is more mechanically robust and less susceptible to the effects of wear and tear, may be fabricated as a sealed package that prevents the ingress of dirt and moisture, may be employed as a replacement mechanism for conventional 5-way navigation devices as well as mouse tilt-wheel mechanisms, and may be manufactured without undue cost or complexity.

SUMMARY

In one embodiment, there is provided an input device comprising a moveable upper magnet having an upper surface and a lower surface, an electrically conductive member disposed below the lower surface of the upper magnet and moveable in conjunction therewith, an electrode array comprising a plurality of electrically conductive sense electrodes and at least one drive electrode, the sense and drive electrodes being spaced apart from the electrically conductive member by a gap, a stationary lower magnet disposed below the plurality of sense electrodes and the drive electrode, the lower magnet being configured and positioned to attract the upper magnet to a centered rest position thereabove, a drive signal circuit configured to provide an electrical drive signal to the electrically conductive member through the drive electrode and the gap, and a capacitance measurement circuit operably coupled to the electrically conductive member and the sense electrodes, the circuit being configured to detect changes in capacitance occurring between the electrically conductive member and the sense electrodes when the upper magnet is moved from the centered rest position. The upper magnet is moveable by a user in respect of the lower magnet, the plurality of sense electrodes and the drive electrode disposed therebelow, and the lower magnet is further configured to exert a magnetic force on the upper magnet to return the upper magnet to the centered rest position when the upper magnet is moved from the centered rest position and then released by the user.

In other embodiments, there are provided methods of using and making an input device comprising providing a moveable upper magnet having an upper surface and a lower surface, providing an electrically conductive member disposed below the lower surface of the upper magnet and moveable in conjunction therewith, providing an electrode array comprising a plurality of electrically conductive sense electrodes and at least one drive electrode, the sense and drive electrodes being spaced apart from the electrically conductive member by a gap, providing a stationary lower magnet disposed below the plurality of sense electrodes and the drive electrode, the lower magnet being configured and positioned to attract the upper magnet to a centered rest position thereabove, providing a drive signal circuit configured to provide an electrical drive signal to the electrically conductive member through the drive electrode and the gap, and providing a capacitance measurement circuit operably coupled to the electrically conductive member and the sense electrodes, the circuit being configured to detect changes in capacitance occurring between the electrically conductive member and the sense electrodes when the upper magnet is moved from the centered rest position configuring the upper magnet, the electrically conductive member the electrode array and the lower magnet such that the upper magnet is moveable by a user in respect of the lower magnet and the plurality of sense electrodes and the drive electrode disposed therebelow, and the lower magnet exerts a magnetic force on the upper magnet to return the upper magnet to the centered rest position when the upper magnet is moved from the centered rest position and then released by the user.

In addition to the foregoing, numerous other embodiments are contemplated.

BRIEF DESCRIPTION OF THE DRAWINGS

FIGS. 8(a) through 8(e) illustrate some schematic relationships between overlying sliding electrically conductive member or plate 30 and underlying drive electrode 45 and sense electrodes 41a through 44c according to one embodiment of the invention.

The drawings are not necessarily to scale. Like numbers refer to like parts or steps throughout the drawings.

DETAILED DESCRIPTIONS OF SOME PREFERRED EMBODIMENTS

In the following Detailed Description, reference is made to the accompanying drawings, which form a part hereof, and in which are illustrated specific embodiments according to which the invention may be practiced. In this regard, directional terminology, such as "forward," "backward," "side," "top," "bottom," "front," "back," etc., is used with reference to the orientation of the Figures being described. Because the components of various embodiments of the invention may be positioned in a number of different orientations, the directional terminology is used for purposes of illustration and is in no way limiting. It is to be understood that other embodiments may be utilized, and that structural or logical changes may be made without departing from the scope of the present invention. The following Detailed Description, therefore, is not to be taken in a limiting sense, and the scope of the present invention is defined by the appended claims.

Figure 1:
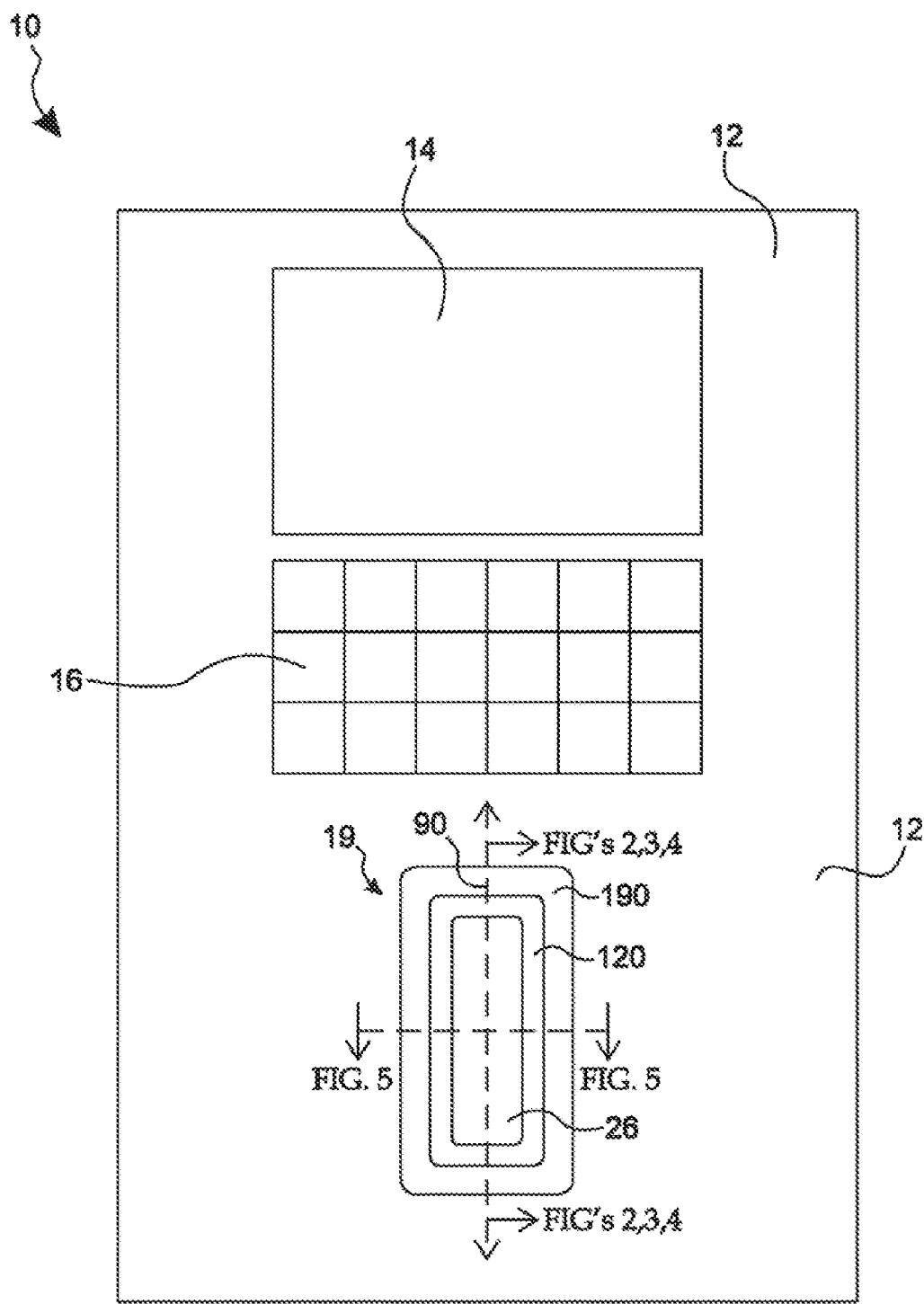
FIG. 1 is a top plan view of the upper surface of a portable device employing a magnetic re-centering mechanism in a capacitive input device according to one embodiment of the invention.
Figure 5:
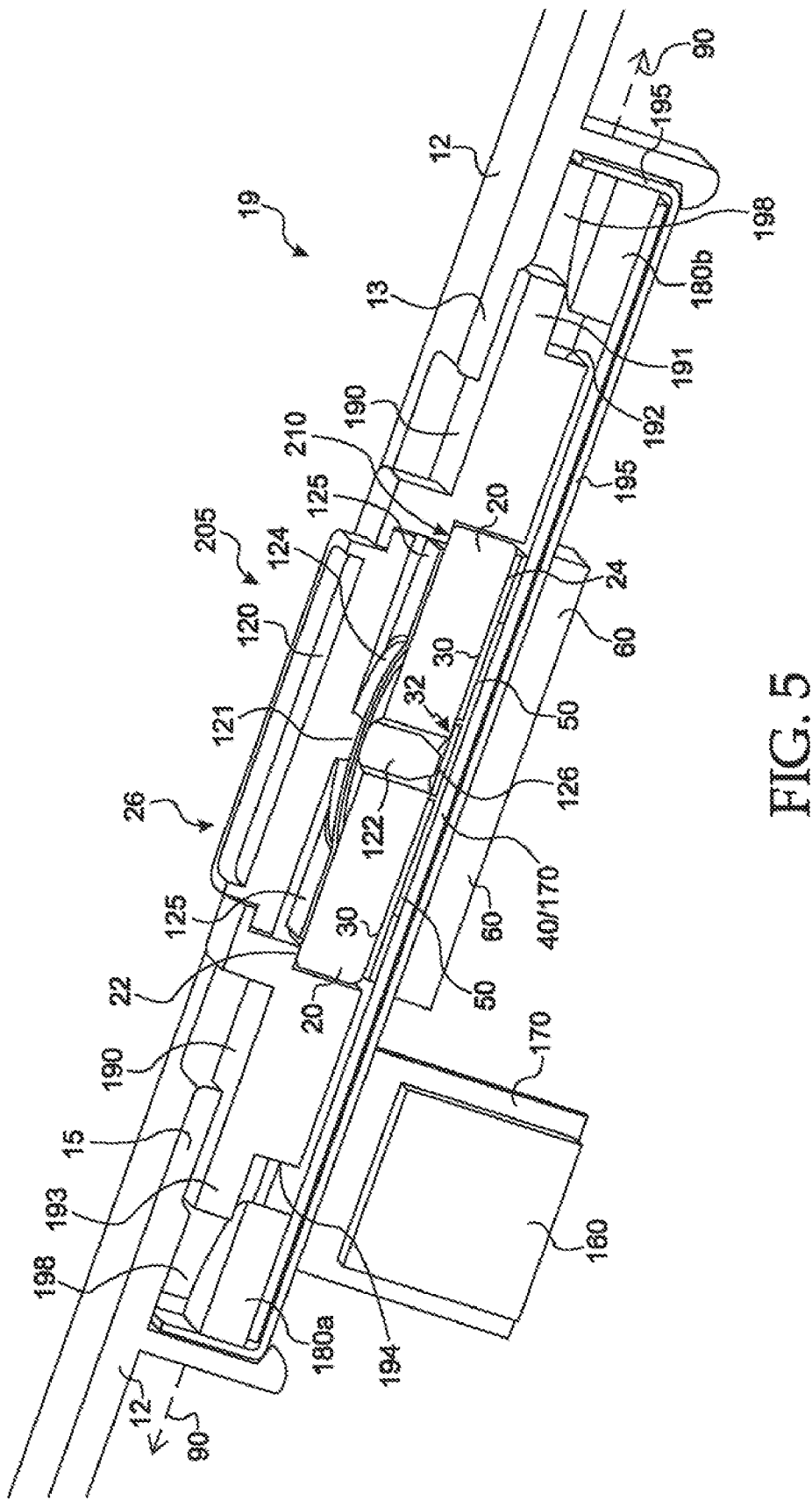
FIG. 5 is a cross-sectional perspective view taken from the side and top of slider assembly 205 of FIG. 4.

Referring first to FIGS. 1 and 5, in many commercial applications such as mobile telephones, input device 19 will typically comprise three main sets of components: (1) electrode array 40 disposed atop substrate 170, lower magnet 60 disposed therebelow; (2) slider assembly 205 comprising upper magnet 20, electrically conductive member or plate 30, depressable dome 124, plunger 122, where upper magnet 20, plate 30, dome 124 and plunger 122 are laterally slidable forwards and backwards and optionally tiltable side-to-side by a user's finger in respect of underlying electrode array 40, substrate 30 and lower magnet 60, and slider assembly 205 optionally has a central portion thereof that is downwardly deflectable in the direction of underlying electrode array 40; and (3) an integrated circuit comprising capacitance measurement circuit 104 of FIG. 7, which is preferably configured to deliver a drive signal to drive electrode 45, and for sensing changes in capacitance occurring respecting sense electrodes 41a through 44c and overlying plate 30.

These three sets of components will typically be customized according to the particular dimensional and operational specifications set by a mobile device manufacturer, and will therefore be delivered as discrete sets of components or as combined sets of components to the manufacturer for operable interconnection and assembly thereby. For example, the electrode array, the substrate and an integrated circuit soldered to the substrate may be delivered as single assembly to the mobile device manufacturer. Movement of slider assembly 205 laterally forward and backward, or tilting of assembly 205 from side-to-side vertically in respect of underlying electrode array 40 results in changes in the capacitances of, and/or the ratios of capacitance between, sense electrodes 41a through 44c disposed beneath slider assembly 205. Lateral movement of slider assembly 205 is typically limited to between about 1 mm and about 3 mm, although the amount of lateral movement permitted may be smaller or greater. Lateral or vertical movement of slider assembly 205 (which includes plate 30 attached thereto) is detected by capacitance measurement circuit 104, and is typically be employed to generate navigation information, scrolling and/or clicking functionality in mobile device 10. Slider assembly 205 is preferably configured to be returned to central resting position 26 as shown in FIG. 1 atop electrode array 40 by a magnetic biasing system provided by upper magnet 20 and lower magnet 60 when a user's finger is removed from button 120.

FIG. 1 is a top plan view of the upper surface of a portable device employing a magnetic re-centering mechanism in an input device according to one embodiment of the invention. FIG. 1 illustrates a top view of portable electronic device 10, which includes input device 19 according to one embodiment of the present invention. In one embodiment, portable electronic device 10 is a laptop computer. In other embodiments, device 10 is any type of portable electronic device comprising housing 12, display 14, keypad 16 and magnetic re-centering input device 19 for capturing user inputs. Device 10 may be a cellular or wireless telephone, a personal digital assistant (PDA), a digital camera, a portable game device, a pager a portable music player or MP3 device, a handheld computer or any other portable electronic device in which it is desirable to accept user inputs.

In another embodiment, input device 19 may be mounted on the side of a mobile device in a manner similar to that of "smartphone" thumbwheel input devices employed in some mobile telephones such as the SONY ERICSSON™ SEMC M600i mobile phone and some BLACKBERRY™ devices. Input device 19 may also be configured in mobile device 10 such that sliding movement of button 120 forward (or up in FIG. 1) and backward (or down in FIG. 1) occurs from side-to-side (or between left and right in FIG. 1). In some embodiments, the invention provides an input device that is more compact and yet provides superior tactile feedback to a user than conventional input devices.

As illustrated in FIG. 1, device 10 comprises housing 12 which carries display 14, keyboard 16, and magnetic re-centering input device 19. Display 14 comprises a screen and cursor. Display 14 further comprises one or more elements of a graphical user interface (GUI) including, but not limited to keypad 16 and a menu and related icon(s) (not shown in FIG. 1). Keypad 16 comprises one or more keys representing numbers, letters, or other symbols. In some other embodiments, the cursor may comprise objects such as pointers or arrows. Input device 19 comprises center button or positioning element 120 slidably movable within a field of motion for capturing user control inputs associated with electronic device 10, such as selecting and activating functions associated with display 14. In one aspect, input device 19 comprises a magnetic re-centering mechanism for controlling accurate re-centering of center button 120 after movement of puck 120 to an off-center position to capture a user input. This magnetic re-Centering mechanism, according to various embodiments of the invention, is described and illustrated in greater detail in association with FIGS. 2 through 8(e).

Figure 2:
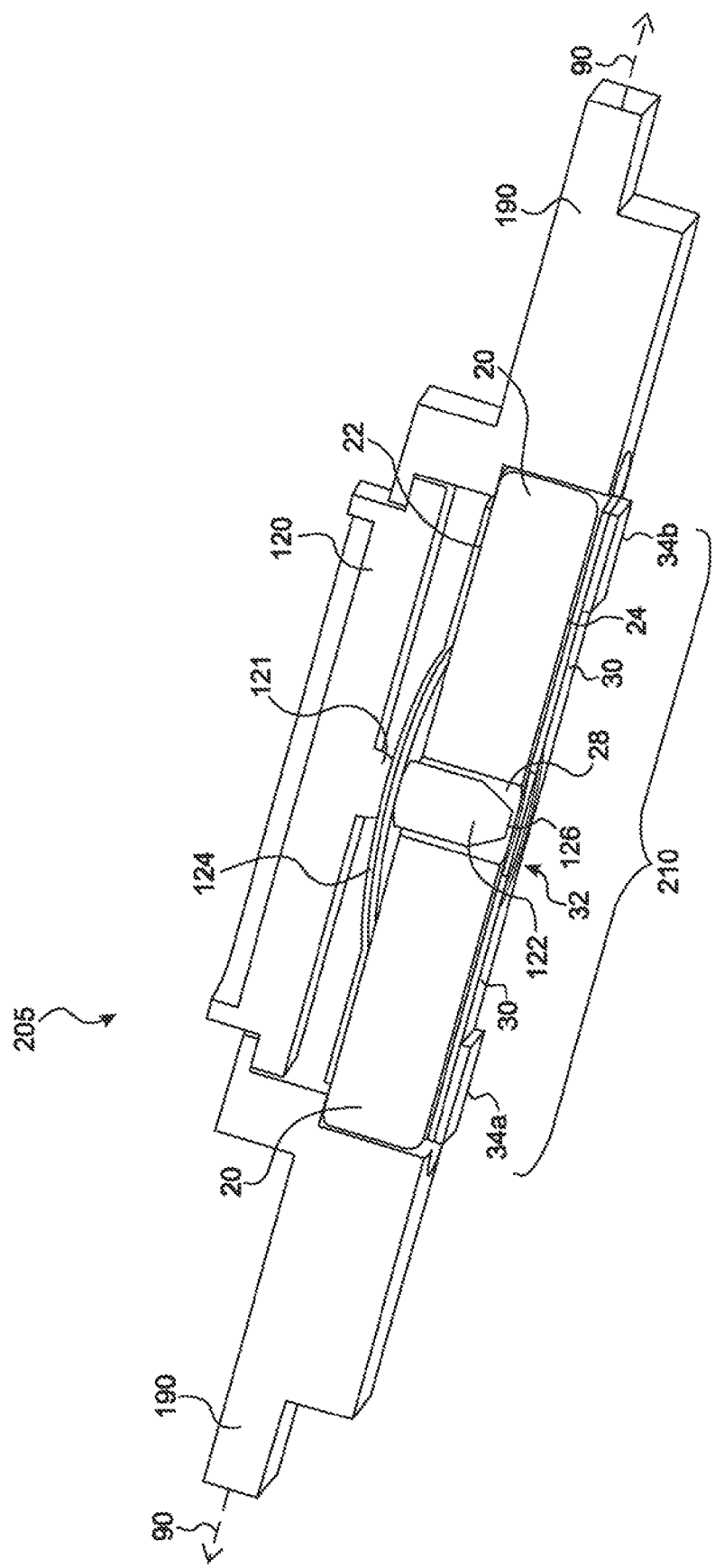
FIG. 2 is a cross-sectional perspective view taken from the side and bottom of slider assembly 205 comprising slider core assembly 210 according to one embodiment of the invention.

FIG. 2 is a cross-sectional perspective view taken from the side and bottom of slider assembly 205 comprising slider core assembly 210 according to one embodiment of the invention. As shown in FIG. 2, assembly 205 comprises center button 120, depressable dome 124 located beneath center button 120 and engaged by protrusion 121 extending downwardly from center button 120, plunger 122 located beneath depressable dome 124 and protrusion 121, electrically conductive member 30 disposed beneath plunger 122, upper magnet 20 having upper surface 22 and lower surface 24, insulative feet/gap maintenance members 34a and 34b and fascia 190. In a preferred embodiment, gap maintenance members 34a and 34b are about 0.25 mm in thickness, and thus gap 50 has a nominal thickness of about 0.25 mm as well. Deformable area or paddle 32 is disposed or formed in the center of member 30 and may be deflected downwardly through the action of a user's finger pushing downwardly on button 120, which in turn causes protrusion 121, depressable dome 124 and plunger 122 to engage and deflect deformable area 32. As illustrated in FIG. 2, plunger 122 is disposed within hole 28 disposed in upper magnet 20. Slider core assembly 210 is shown in FIG. 2 as being mounted in fascia 190, which also holds portions of center button 120 and core assembly 210 therewithin. Imaginary principal axis 90 extends along and is aligned with the major longitudinal axis of fascia 190 and is centered in respect thereof.

Figure 3:
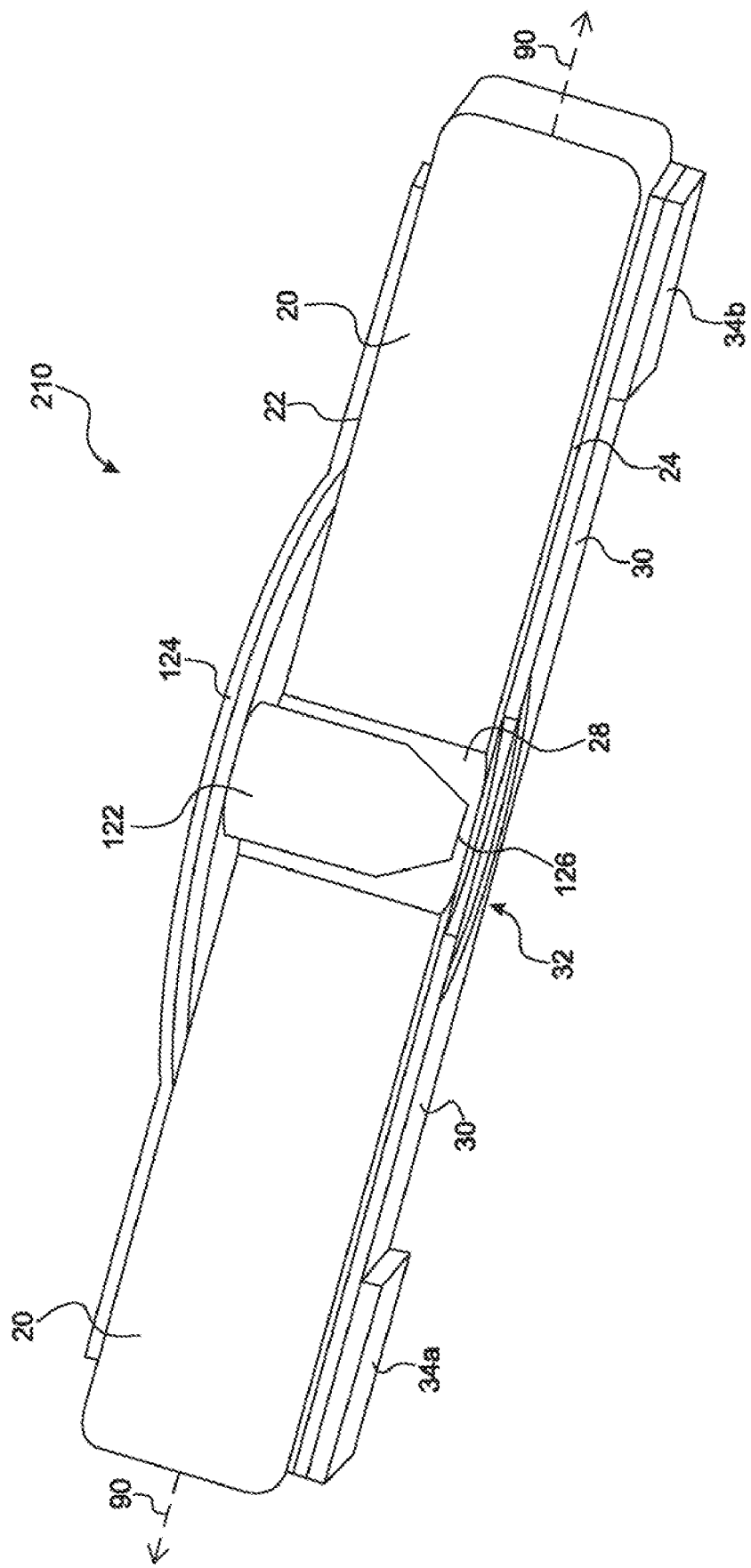
FIG. 3 is a cross-sectional perspective view taken from the side and bottom of slider core assembly 210 of FIG. 2.

Referring now to FIG. 3, there is shown a cross-sectional perspective view taken from the side and bottom of slider core assembly 210. FIG. 3 shows a closer view of slider core assembly 210 illustrated in FIG. 2. As shown, upper magnet 20 has plunger 122 disposed within central hole 28, which may be pressed downwardly to engage deformable portion 32 of electrically conductive member or plate 30. In one embodiment, depressable dome 124 is formed of a suitable electrically conductive material such as metal or depending on the particular configuration of input device 19 that is to be provided, an electrically insulative material. For examples dome 124 may be formed of an electrically conductive material to provide functionality such as the ability to close a switch.

Dome 124 is also preferably configured structurally to provide tactile feedback to a users finger in such a manner as to indicate that the dome has been depressed or released by the user's finger. In one embodiment, dome 124 is further covered with a sheet of electrically insulative material manufactured by PANASONIC™ known by the trade name EP™. Electrically insulative feet or spacers 34a and 34b electrically isolate electrically conductive member or plate 30 from underlying electrode array 40; array 40 is not shown in FIG. 2 or 3. In one embodiment, plate 30 is attached to lower surface 24 of upper magnet 20 by a sheet of pressure sensitive adhesive. Central portion or paddle 32 of plate 30 is configured to permit downward deflection thereof through the action of bottom portion 126 of plunger 122 being pressed downwardly thereagainst.

Figure 4:
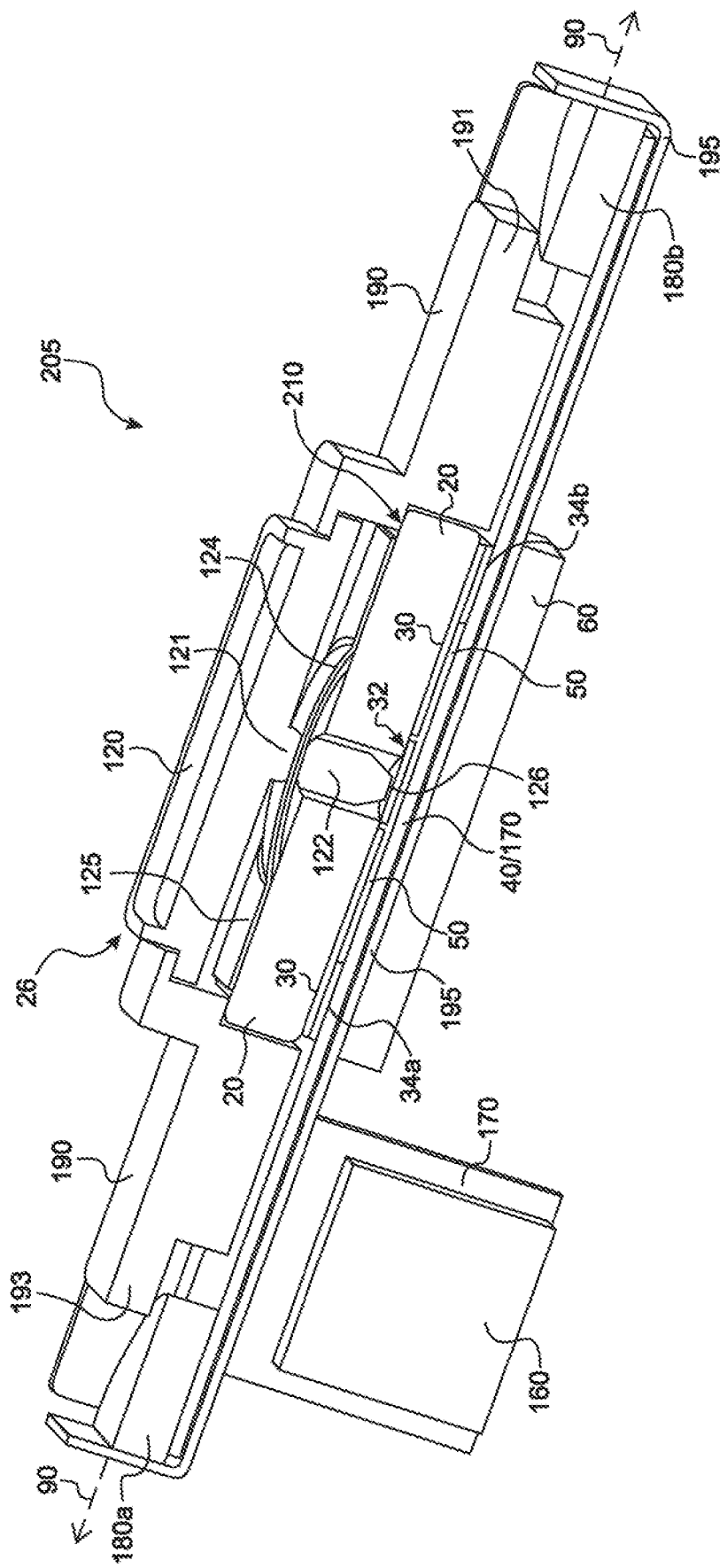
FIG. 4 is a cross-sectional perspective view taken from the side and top of slider assembly 205 attached to base 195 according to one embodiment of the invention, where base 195 further comprises substrate 170 and integrated circuit 160.

FIG. 4 is a cross-sectional perspective view taken from the side and top of slider assembly 205 magnetically coupled to base 195 according to one embodiment of the invention, and further comprising substrate 170 and integrated circuit 160. Base 195 has attached thereto lower magnet 60C which in a preferred embodiment is disposed directly beneath and aligned with upper magnet 20 when upper magnet 20 is in centered rest position 26. Gap 50 separates electrically conductive member or plate 30 from electrode array 40, which is disposed atop or in substrate 170, which in turn is disposed atop a bottom portion of case 195. In preferred embodiments, gap 50 ranges between about 0.15 mm and about 0.30 mm, with a gap of 0.25 mm being preferred in some embodiments. As shown in the left side of FIG. 4, a portion of substrate 170 projects downwardly from that portion of substrate 170 which is located between upper magnet 20 and lower magnet 60, and has integrated circuit 160 disposed thereon. In a preferred embodiment, integrated circuit 160 comprises capacitance sensing circuit 104 (not shown in FIG. 4), which is operably connected to electrode array 40 and more about which is said below.

In preferred embodiments, substrate 170 is preferably a flexible printed circuit board comprising electrical conductors disposed upon KAPTON™ although in other embodiments may comprise FR-4 fiberglass, although many other materials and compositions suitable for use in printed circuit boards may also be used, such as FR-2 fiberglass, polyimide, GETEK™, BT-epoxy, cyanate ester, PYRALUX™, polytetrafluoroethylene (PTFE) or ROGERS BENDFLEX™. In a preferred embodiment, substrate 170 has electrically conductive conductors formed of copper, ITO, electrically conductive polymers, plastics, epoxies or adhesives, or any another suitable metal or electrically conductive material disposed thereon or therein, which may be formed by any of a number of methods known to those skilled in the art, such as silk screen printing, photoengraving with a photomask and chemical etching, PCB milling and other suitable techniques.

Continuing to refer to FIG. 4, it will be seen that fascia 190 has secured, attached to or captured therein various components such as depressable dome 124, plunger 122 and upper magnet 20 (which together comprise core slider assembly 210) and center button 120 which move together as a single unit as a user pushes or slides button 120 forward in the direction of mechanical biasing mechanism 180b or backwards in the direction of mechanical biasing mechanism 180a. As is described in further detail below, center button 120, core slider assembly 120 and fascia 190 are also preferably configured to permit these elements to tilt to either side of principal axis 90, thereby providing additionally functionality to magnetic re-centering input device 19.

Continuing to refer to FIG. 4, portions of device 19 such as case 195, substrate 170 and slider assembly 204 may be configured to include one or more fluid- or gas-resistant membranes or seals to protect input device 19 and mobile device 10 from the ingress of undesired fluids or gases. Slider assembly 205 may also be provided as a sealed unit that is configured to resist the ingress of dirt and moisture. It is one advantage of the invention that upper and lower magnets 20 and 60 can couple magnetically through or in the presence of such seals or membranes disposed therebetween or therearound, while dirt and moisture are unable to penetrate such seals and membranes.

FIG. 5 is a cross-sectional perspective view taken from the side and top of slider assembly 205 magnetically coupled to base 195 and mounted in case 12 according to one embodiment of the invention. As shown, slider core assembly 210, and button 120 and depressable dome 124 attached thereto, are constrained to move along principal axis 90 and are held within case 12 by front projection 191 of fascia 190 and rear projection 193 of fascia 190, which are positioned and constrained to move beneath front and rear restraining members 13 and 15, respectively, of case 12. Slider core assembly is therefore constrained in the manner in which it can move within cavity 198 defined by base 195, housing 12, front and rear restraining members 13 and 152 and mechanical biasing elements 180*a* and 180*b*. When slider core assembly 210 is moved in a forward direction towards mechanical biasing mechanism 180*b* by a user's finger placed on center button 120, front portion 192 of fascia 190 engages mechanical biasing mechanism 180*b* and is pushed thereagainst. In a preferred embodiment, mechanical biasing mechanism 180*b* is formed of an elastic or resilient material such as silicone or rubber that pushes back with an increasing amount of force as front portion 192 is pushed ever more vigorously thereagainst. Mechanical biasing mechanism 180*a* and rear portion 194 operate in a similar manner, where as slider core assembly 210 is moved in a backward direction towards mechanical biasing mechanism 180*a* by a users finger placed on center button 120, rear portion 194 engages and pushes against mechanical biasing mechanism 180*a*.

Figure 6:
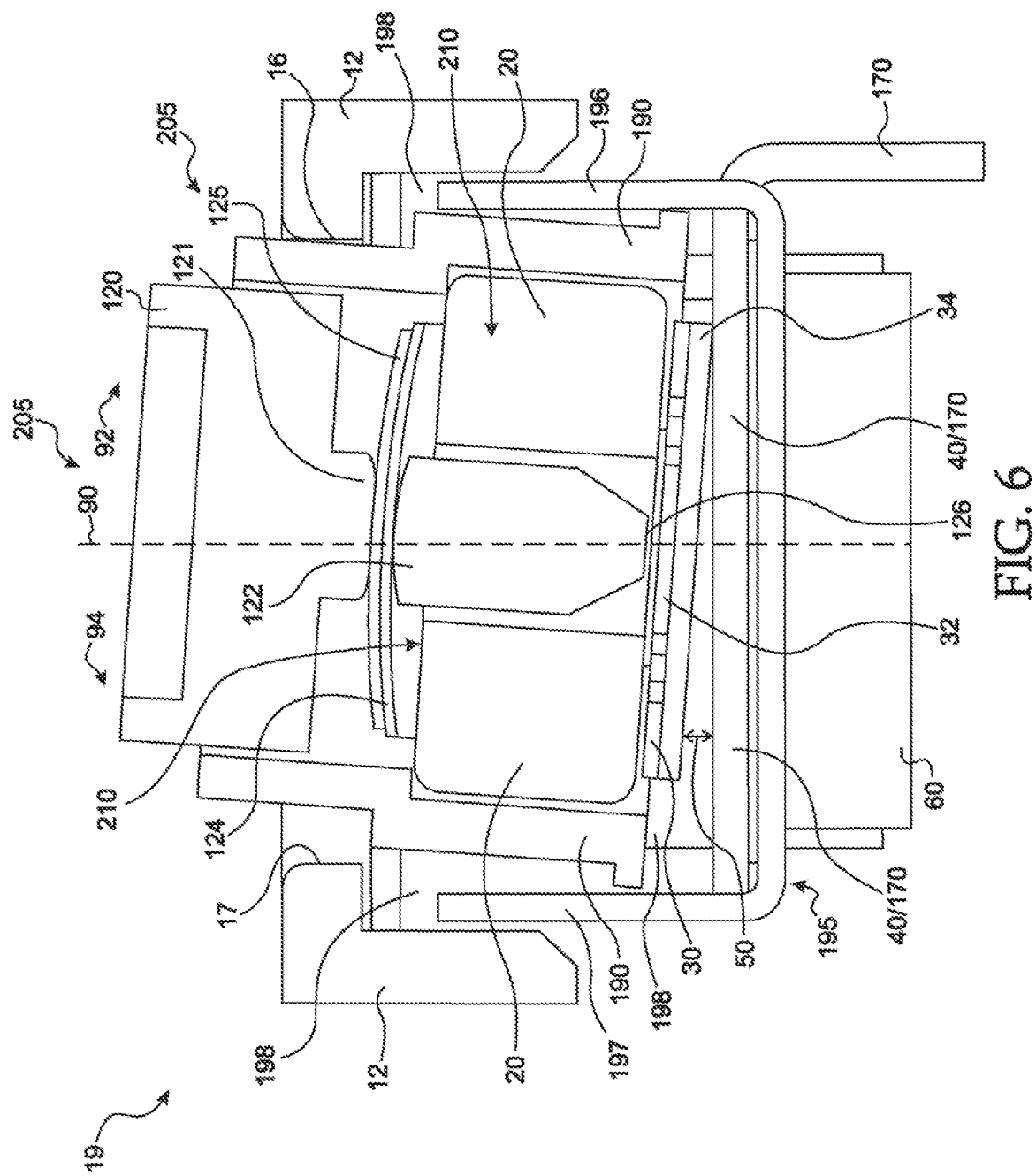
FIG. 6 is a cross-sectional end view of slider assembly 205, base 195 and housing 12 of FIG. 5.

FIG. 6 is a cross-sectional end view of the slider assembly 205 disposed within base 195 and mounted in housing 12 according to one embodiment of the invention. As shown, slider core assembly 210 and slider assembly 205 are constrained to move in respect of lateral or sideways motion within cavity 198, and in respect of tilting motion, by sidewalls 196 and 197 of base 195, as well as by upper sidewalls 16 and 17 of housing 12. Thus, in a preferred embodiment, slider core 210, slider assembly 205, base 195 and housing 12 are configured in respect of one another to permit slider core 210 and slider assembly 205 to be tilted to one side or the other of principal axis 90 by a user's finger pressing center button 120 sideways and towards the desired side as shown in FIG. 6. Thus, in addition to having functionality imparted to magnetic red centering input device 19 by the forward and backward movement of slider core 210 within constrained cavity 198, additional functionality is also imparted to input device 19 by tilting of slider core assembly 210 within constrained cavity 198, more about which is said below.

According to the embodiments illustrated in FIGS. 2 through 6 hereof, it will now be seen that slider core assembly 210 and slider assembly 205 are constrained to move within housing 12 and base 195 within certain ranges. As described above in respect of FIG. 5, slider assembly 205 is permitted to be moved forward and backward by a users finger along principal axis 90 over a limited range. As described above in respect of FIG. 6, slider assembly 205 is permitted to be tilted by a user's finger to either side of principal axis 90 over a limited range. The effect of slider assembly 205 being slid forward or backward is to change the relative positions of electrically conductive member 30 and underlying electrode array 40 in respect of one another, where gap 50 remains substantially constant (see, for example, FIG. 5), more about which is said below The effect of slider assembly 205 being tilted to one side or the other is to increase gap 50 on the side opposite principal axis 90 to which slider assembly 205 is pressed sideways, and to decrease gap 50 on the side to which slider assembly 205 is pressed sideways (see, for example, FIG. 6), also more about which is said below.

According to some of the preferred embodiments illustrated in FIGS. 2 through 6 hereof, these changes in the relative positions of electrically conductive member or plate 30 and electrode array 40 respecting one another, and in gap 50 from one side to the other of principal axis 90, may be employed to effect 5-way scrolling and/or clicking functionality in magnetic re-centering input device 19. Such functionality is accomplished by sensing changes in capacitance that occur between electrically conductive member 30 (which slides and tilts in conjunction with the movement of slider assembly 205, and to which member 30 is attached) and underlying electrode array 40. Such changes in capacitance arise from the horizontal and/or vertical movement of member 30 respecting electrode array 40, which remains stationary as member 30 slides and tilts. Note that clicking is specifically contemplated in the embodiments illustrated in FIGS. 2 through 8 as being accomplished by pressing downwardly on button 120 to collapse dome 124 and drive plunger 122 into central portion or paddle 32 of plate 30, which in turn causes paddle 32 to engage drive electrode 45 and thereby generate a capacitively-sensed click.

Referring now to FIGS. 1 through 6, upper magnet 20 and lower magnet 60 are configured so that the respective magnetic poles of exert an attractive magnetic force on one another. For example, one end of upper magnet 20 may have a north orientation whereas the end of lower magnet 60 directly therebeneath has a south orientation. In addition upper magnet 20 and lower magnet 60 are configured such that when slider assembly 205 is slid or tilted by a users finger from center level resting position 26, the magnetic force exerted by the magnets upon one another acts to cause center button 120 and upper magnet 20 to return to center level resting position 26 when the users finger is removed therefrom. In such a manner, a magnetic biasing force constantly operates on slider assembly 205 to return assembly 205 to center resting position 26 but does so without the use of any springs or other mechanical parts. Moreover, because no mechanical parts are employed to impart a re-centering biasing force to input device 19, input device 19 disclosed herein is less susceptible to mechanical breakdown or failure than many prior art recentering input devices.

The volume occupied by upper magnet 20 and lower magnet 60 in input device 19 may be minimized by employing magnetic materials to form magnets 20 and 60 that are capable of exerting relatively strong magnetic forces on one another according to a high magnetic force/volume ratio. In this respect, neodymium has been discovered to be a particularly efficacious material for use in input device 19. Upper magnet 20 and lower magnet 60 may be formed of any suitable magnetic, ferromagnetic or ferromagnetic material known to those skilled in the art, however. For example, and in addition to neodymium, upper magnet 20 and lower magnet 60 may be formed of materials such as neodymium-iron-boron (NIB), samarium-cobalt, sintered composites of powdered iron oxide and barium/strontium carbonate ceramic, aluminum, nickel and cobalt materials, ferrite magnetic materials, ferromagnetic materials and substances, ferromagnetic materials and substances, ceramic magnetic materials, ferric magnetic materials, rare earth magnetic materials, plastics, epoxies or adhesives loaded with ferro-, ferri or other magnetic materials or particles, flexible magnetic materials having, for example, vinyl, resin or another suitable binder loaded therein, and nano-structured magnetic materials.

Upper magnet 20 and lower magnet 60 may be formed according to any of several well known manufacturing methods, including but not limited to, injection molding, sintering, casting, chemical etching, or mechanical milling. Suitable magnetic materials and magnets may be obtained, for example, from Arnold Magnetic Technologies Corporation of Rochester, N.Y.

An electromagnetic device may also be substituted for upper magnet 20 and lower magnet 60 as a re-centering device, although the electrical power required to drive such an electromagnet would have obvious energy consumption drawbacks in a portable electronic device. In a stationary device with an ample electrical power supply, however, an electromagnet configured to operate as a re-centering device could have certain advantages respecting magnets.

Figure 7:
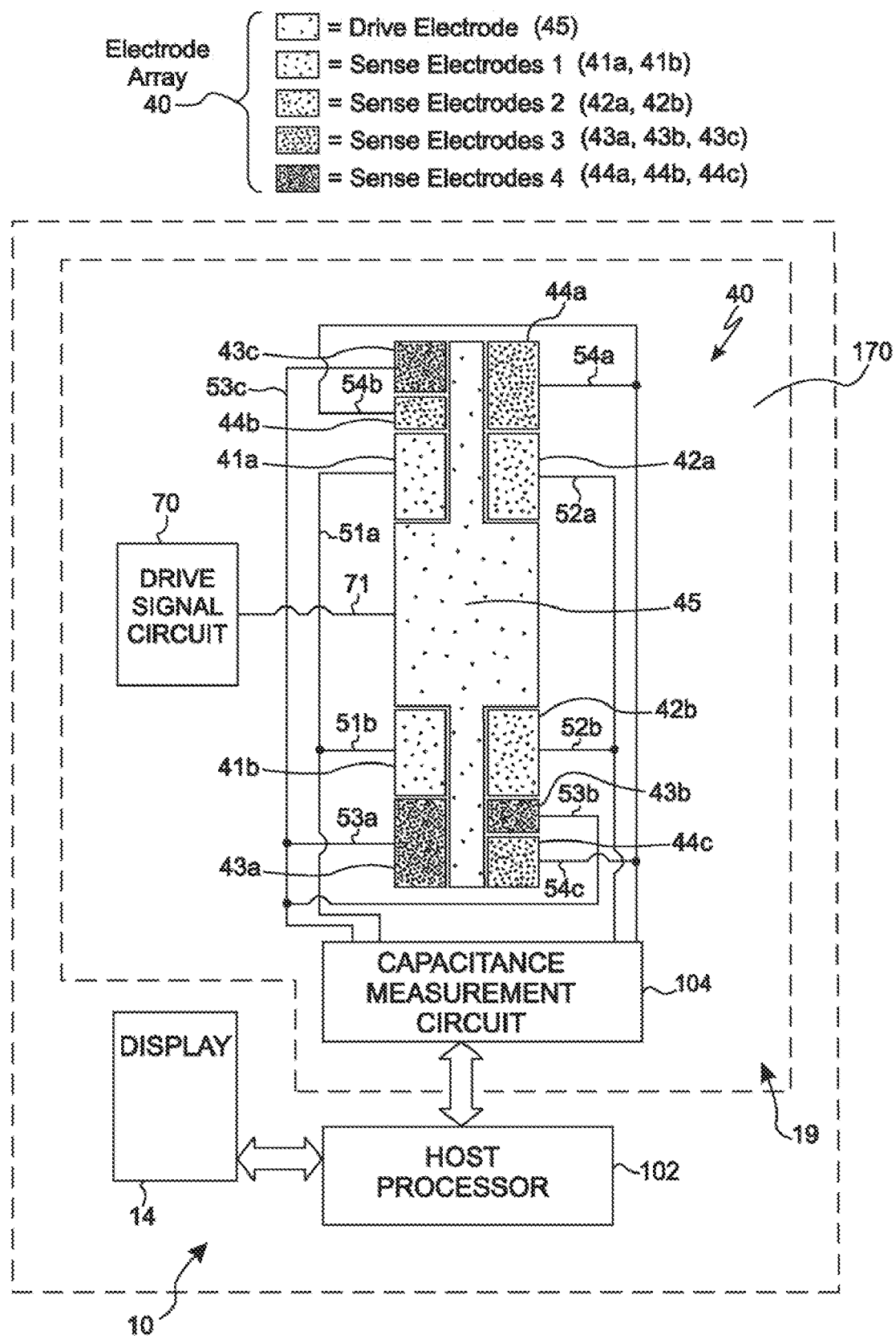
FIG. 7 illustrates some schematic relationships between electrode array 40, capacitance measurement circuit 104, host processor 102 and display 14 according to one embodiment of the invention.

Referring now to FIG. 7, there are shown some schematic relationships between electrode array 40, drive signal circuit 70, capacitance measurement circuit 104, host processor 102, and display 14 according to one embodiment of the invention. As illustrated, electrode array 40 comprises center drive electrode 45 (which is operably connected to drive signal circuit 70, and which provides an appropriate drive signal thereto, such as a 125 kHz square wave signal), and sense electrodes 41a and 41b, 42a and 42b, 43a, 43b and 43c, and 44a, 44b and 44c. Note that electrically conductive member or plate 30, which is positioned atop electrode 40 array and is configured to move over selected portions of electrode array 40, is not shown in FIG. 7.

The values of the individual capacitances occurring between member 30 and sense electrodes 41a through 44c are monitored or measured by capacitance measurement circuit 104 located within portable device 10, as are the operating states of any additional switches provided in conjunction therewith. In a preferred embodiment, a 125 kHz square wave drive signal is applied through capacitive coupling to member 30 by drive signal circuit 70 through drive electrode 45 so that the drive signal is applied continuously to member or plate 30, although those skilled in the art will understand that other types of AC and DC drive signals may be successfully employed. Indeed, the drive signal need not be supplied by drive signal circuit 70, and in some embodiments is provided by an IC which also includes capacitance measurement circuit 104. In a preferred embodiment, drive signal circuit 70 and capacitance measurement circuit 104 are incorporated into a single circuit or integrated circuit.

Capacitance measurement circuit 104 may be configured to require a series of capacitance changes indicative of movement of slider assembly 205 over a minimum distance or tilt range that may be programmed by a user in capacitance measurement circuit 104 before a step or scrolling function is activated or enabled.

FIG. 7 further illustrates electrode array 40 and its connection to capacitance measurement circuit 104, host processor 102, and display 14, as well as the schematic arrangement of electrically conductive drive electrode traces or conductors 51a, 51b, 52a, 52b, 53a, 53b, 53c, 54a, 54b and 54c corresponding, respectively, to electrodes 41a, 41b, 42a, 42b, 43a, 43b, 43c, 44a, 44b and 44c, which are electrically connected to capacitance measurement circuit 104. Note that electrodes 41a and 41b are connected electrically in common, as are electrodes 42a and 42b, 43a, 43b and 43c, and 44a, 44b and 44c. Such a physical arrangement of electrodes 41a, 41b, 42a, 42b, 43a, 43b, 43c, 44a, 44b and 44c in electrode array 40 permits some portion of each of electrode sets 41a and 41b, 42a and 42b, 43a and 43b, and 44a, 44b and 44c to remain capacitively connected to overlying electrically conductive member or plate 30 regardless of the position of member or plate 30 in respect of underlying electrode array 40.

Continuing to refer to FIG. 7, electricity conductive sense electrodes 41a through 44c and corresponding electrically conductive traces or conductors 51a through 54c are disposed on or in substrate 170, and are operably and electrically connected to capacitance measurement circuit 104, which in a preferred embodiment is an integrated circuit especially designed for the purpose of sensing changes in capacitance and reporting same to host processor 102. FIG. 7 also illustrates schematically the connections between capacitance measurement circuit 104 and host processor 102, and between host processor 102 and display 14. As illustrated, electrical conductors 51a through 54c and 71 couple sense and drive electrodes 41a through 44c and 45 to capacitance measurement circuit 104 and drive signal circuit 70, which in turn are operably coupled to other circuitry disposed in magnetic re-centering input device 19, as perhaps to other circuitry disposed in mobile device 10. In a preferred embodiment, sense electrodes 41a through 44c are continuously capacitively coupled to drive electrode 45 through plate 30 such that capacitance changes occurring therebetween may be detected by capacitance measurement circuit 104.

In the embodiments illustrated in FIGS. 7 and 8, substrate 170 comprises four different sets of rectangularly-shaped sense electrodes, where two such sets consist of two electrodes each (i.e., electrode sets 41a and 41b, and 42a and 42b) and two other sets of such electrodes consist of three electrodes each (i.e., electrode sets 43a, 43b and 43c, and 44a, 44b, and 44c), and one cross-shaped drive electrode 45 disposed thereon or therein, all of which are preferably fabricated from a layer of conductive metal (typically copper) disposed on or in substrate 170 according to any of the various techniques described above, or using other suitable techniques and materials known to those skilled in the art, such as copper, gold-plated copper, or indium tin oxide (ITO).

Electrically conductive member or plate 30 overlies, and in a resting untilted position is spaced apart from, electrode array 40. It should be noted that while the embodiments disclosed in the Figures employ such sets of rectangularly and cross-shaped electrodes and one central or drive electrode 45, many other numbers of electrode structures and elements may instead be employed, as may electrodes having different shapes and configurations than those shown explicitly in the Figures.

As illustrated in FIG. 7, sense electrodes 41a through 44c and drive electrode 45 disposed on or in substrate 170 are electrically coupled to capacitance measurement circuit 104, which in turn produces output signals routed to host processor 102 via, for example, a serial I²C-compatible or Serial Peripheral Interface (SPI) bus, where such signals are indicative of the respective capacitances measured between electrically conductive member or plate 30 and sense electrodes 41a through 44c. In the case where capacitance sensing circuit 104 is an Avago AMRI-2000 integrated circuit, the AMRI-2000 may be programmed to provide output signals to host processor 102 that, among other possibilities, are indicative of the amount of, or change in the amount of, spatial deflection of electrically conductive plate or member 30 (e.g., dX and/or dY) or the number and/or type of clicks or scrolling sensed. Host processor 102 may use this information to control display 14 as discussed above. Circuit 104 may be any appropriate capacitance sensing circuit or integrated circuit and may, for example, correspond to those employed in some of the above-cited patent applications. Capacitance measurement circuit 104 may also be configured to detect the grounding of any of electrodes 41a through 44c or 45.

Referring now to FIG. 83 there are shown FIGS. 8(a) through 8(e) illustrate some schematic relationships between overlying electrically conductive member or plate 30 and underlying sliding drive electrode 45 and sense electrodes 41a through 44c according to one embodiment of the invention. In FIG. 8(a), overlying member or plate 30 is in centered resting position 26 illustrated in FIG. 1. In FIG. 8(b), overlying member or plate 30 is moved forwardly in respect of underlying electrode array 40 to effect a first function such as taking a single step according to the changes in capacitance sensed by sense electrodes 41a through 44c. In FIG. 8(c), overlying member or plate 30 is moved forwardly against and/or into mechanical biasing member 180b (not shown in FIG. 8) and further over the forwardmost portions of electrode array 40 to effect an extension of the first function such as velocity-controlled scrolling according to the changes in capacitance sensed by sense electrodes 41a through 44c. Note that in FIG. 8(c) cross 27 denoting the center of member or plate 30 remains disposed over a portion of drive electrode 45, notwithstanding its maximum forward position. Such a configuration of drive electrode 45 permits a capacitively-sensed click to be registered by circuit 104 through the action of a user pushing center portion 32 downwardly closer to drive electrode 45 by pressing button 120 to collapse dome 124 and drive plunger 122 downwardly at any point along the travel of plate 30. The forwardmost position of member or plate 30 illustrated in FIG. 8(c) is preferably determined by the physical configuration of housing 12, fascia 190 and mechanical biasing element 180b, although other movement or range-limiting configurations may also be used.

In FIG. 8(d), overlying member or plate 30 is moved backwardly in respect of underlying electrode array 40 to effect a second function such as stepping in the opposite direction according to the changes in capacitance sensed by sense electrodes 41a through 44c. In FIG. 8(e), overlying member or plate 30 is moved backwardly against and/or into mechanical biasing member 180a (not shown in FIG. 8) and further over the backwardmost portions of electrode array 40 to effect an extension of the second function velocity-controlled scrolling in the opposite direction according to the changes in capacitance sensed by sense electrodes 41a through 44c. Note that in FIG. 8(e) cross 27 denoting the center of member or plate 30 remains disposed over a portion of drive electrode 45, notwithstanding its maximum backward position. Such a configuration of drive electrode 45 permits a capacitively-sensed click, a third function, to be registered by circuit 104 through the action of a user pushing center portion 32 downwardly closer to drive electrode 45 by pressing button 120 at any point along the travel of plate 30. The backwardmost position of member or plate 30 illustrated in FIG. 8(e) is preferably determined by the physical configuration of housing 12, fascia 190 and mechanical biasing element 180a, although other movement or range-limiting configurations may also be used.

Continuing to refer to FIGS. 8(a) through 8(e), in a preferred embodiment upper magnet 20, lower magnet 60 (not shown in FIGS. 8(a) through 8(e)) and plate 30 are configured, dimensioned and spaced apart from one another such that when plate 30 is moved forwardly or backwardly, lower magnet 60 exerts a continuous re-centering force on upper magnet 20 such that plate 30 is quickly and accurately re-centered when the user's finger is released from button 120. In one embodiment, upper magnet 20 and lower magnet 60 are permanent bar magnets with the magnetic field lines thereof being oriented such that magnetic field lines are normal or near-normal to the thicknesses thereof. Thus, upper magnet 20 cannot be permitted to be displaced too far in a forward direction or a backward direction for otherwise at a certain point lower magnet 60 would actually repel upper magnet 20. Mechanical biasing elements 180a and 180b, in conjunction with case 195 and housing 12, are configured to constrain slider assembly 205 from moving too far in the forward or backward direction. Note further that electrode array 40, and more particularly drive electrode 45 thereof, is configured such that substantially equal portions of surface area of drive electrode 45, as well as some portion of all of sense electrodes 41, 42, 43 and 44, remain disposed beneath electrically conductive member or plate 30 as upper magnet 20 and plate 30 are moved over electrode array 40, thereby maintaining the sensitivity of input device 19 irrespective of the relative positions of plate 30 and electrode array 40. [What I meant to say is that the amount of sense area covered by the sense plate remains constant regardless of the position of the plate.]

Device 19 may be further configured to effect additional functionality through sensing tilting of overlying member or plate 30 to either side of principal axis 90 and in respect underlying electrode array, as discussed above in connection with FIG. 6. Such additional functionality triggered by tilting may include, but is not limited to stepping left and right, thus providing fourth and fifth functions.

In addition to sensing backward and forward motion of plate 30, and side-to-side tilting of plate 30, electrode array 40 may also be configured to detect vertical deflection of central portion 32 of plate 30 towards drive electrode 45 by a user's finger pressing downwardly upon button 120 (which transmits such downward force through dome 124 and plunger 122, whim engages central portion 32 and presses same downwardly towards drive electrode 45). In one configuration of device 19, a vertical force applied by users finger 23 on central button 120 depresses central portion 32 of sense plate 30 to cause a reduction in the thickness of gap 50 disposed between plate 30 and drive electrode 45 and indeed cause physical contact between plate 30 and electrode 45, which in turn effects a change in the capacitance between plate 20 and sense electrodes 41a through 44c. Such sensing of the vertical deflection of plate 30 may be used, by way of example, to enhance navigation algorithms and/or to provide clicking functionality to capacitive sensing input device 19. In one embodiment, gap 50 is about 200 microns in thickness, and center portion 32 of sense plate 30 is bowed slightly upwards, when pressed through the action of users finger 23, center button 120, dome 124 and plunger 122, plate 30 flattens out, and if pressed further establishes electrical contact with drive electrode 45, thereby resulting in ohmic contact between plate 30 and electrode array 40 and significantly increasing the amount of drive signal provided to plate 30, which drive signal is then coupled into underlying sense electrodes 41a through 44c.

The embodiment of device 19 illustrated in FIGS. 2 through 8(e) operates in accordance with the principles of mutual capacitance, or capacitance occurring between two opposing charge-holding surfaces (e.g., between sense plate 30 and drive electrode 45, and between plate 30 and sense electrodes 41a through 44c) in which some electrical current passing through one surface passes over into the other surface through a small gap (e.g., gap 50) disposed therebetween. In FIGS. 8(a) through 8(e), for example, plate 30 capacitively couples charge from drive electrode 45 to sense electrodes 41a through 44c. That is, during operation of input device 19, some portion of the charge corresponding to the drive signal is transferred across gap 50 between drive electrode 45 and plate 30, and across gap 50 between plate 30 and sense electrodes 41a through 44c.

Electrically conductive member or plate 30 is preferably thin (e.g., about 0.1 mm in thickness) and formed of a strong, flexible, light material such as stainless steel or any other suitable metal or material. Plate 30 may assume any of a number of different physical configurations or shapes, such as a series of discrete strips or members electrically connected to one another, a disc, a plate, a circle, an ovoid, a square, a rectangle, a cross-shaped member, a star-shaped member, a pentagon, a hexagon, an octagon, or any other suitable shape or configuration. Plate 30 may also have an electrically conductive coating, such as a clear conductor like indium tin oxide or ITO, or a suitable paint, polymer, adhesive or epoxy disposed thereon.

In an embodiment particularly well suited for use in portable electronic device 10 such as a mobile telephone, representative values for the length, width or diameter of plate 30 range between about 10 mm and about 50 mm, with lengths, widths or diameters of about 3 mm, about 4 mm, about 5 mm, about 6 mm, about 7 mm, about 8 mm, about 9 mm, about 10 mm, about 12 mm, about 14 mm, about 16 mm, about 18 mm, about 20 mm, about 30 mm and about 40 mm being preferred. In one preferred embodiment, plate 30 ranges between about 3 mm and about 6 mm in width and between about 15 mm and about 25 mm in length. In another preferred embodiment, plate 30 ranges between about 4 mm and about 5 mm in width and between about 15 mm and about 25 mm in length. Such small dimensions, especially width, for plate 30 appear to be unique in the field of capacitive sensing devices and highly desirable in view of the ever-increasing demand for the miniaturization of mobile electronic devices. Other lengths, widths and diameters of plate 30 are of course contemplated. As shown in FIGS. 8(a) though 8(e), in preferred embodiments the dimensions of plate 30 are substantially smaller than that of electrode array 40.

In some embodiments not illustrated in the Figures hereof, an optional light guide layer of conventional construction may be disposed between or near plate 30 and electrode array 40, and is configured to allow light to shine through any translucent or transparent areas that might be disposed in and/or around capacitive sensing input device 19. Alternatively, such a light guide may be disposed beneath plate 30 or above electrode array 40.

Various embodiments of the invention provide an enhanced mobile computing experience by providing an input device configured to accurately and quickly re-center button 120 while providing a sensation of enhanced tactile feedback to a user. The biasing force of the magnetic re-centering mechanism possesses sufficient amplitude to overcome frictional forces acting on button 120 during its travel forwards and backwards to insure that button 120 is affirmatively returned to resting position 26. The magnetic re-centering mechanism of the invention is characterized in having a low profile, and permits input device 19 and mobile electronic device 10 to have small form factors.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof. Although some embodiments described herein comprise a single substrate upon which drive and sense electrodes are mounted or disposed, it is also contemplated that the various sense and drive electrodes may be disposed or mounted upon separate or multiple substrates located beneath sense plate 30 or paddle 32. Note further that multiple drive electrodes may be employed in various embodiments of the invention.

The term "input device" as it appears in the specification and claims hereof is not intended to be construed or interpreted as being limited solely to a device or component of a device capable of effecting both control and data entry functions but instead is to be interpreted as applying to a device capable of effecting either such function, or both such functions.

Various embodiments of slider assembly 205 and other components associated therewith may be employed in mice, and may be substituted, by way of exam pie, for a mouse tilt-wheel and thereby provide a velocity-controlled alternative to manually spinning a scroll wheel repeatedly or "skating." In another embodiment, slider 205 and other components associated therewith may be substituted for a LOGITECH™ MICROGEAR™ device. In another embodiment, slider assembly 205 and other components associated therewith may incorporate detent mechanisms to provide, for example, temporary stops as button 120 is slid along axis 90.

Note further that included within the scope of the present invention are methods of making and having made the various components, devices and systems described herein.

While the primary use of the input device of the present invention is believed likely to be in the context of relatively small portable devices, it may also be of value in the context of larger devices, including, for example, keyboards associated with desktop computers or other less portable devices such as exercise equipment, industrial control panels, washing machines, or equipment or devices configured for use in moist, humid, sea-air, muddy or underwater environments. Similarly, while many embodiments of the invention are believed most likely to be configured for manipulation by a users fingers, some embodiments may also be configured for manipulation by other mechanisms or body parts. For example, the invention might be located on or in the hand rest of a keyboard and engaged by the heel of the users hand.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

I claim:

1. An input device, comprising:
    a moveable upper magnet having an upper surface and a lower surface;
    an electrically conductive member disposed below the lower surface of the upper magnet and moveable in conjunction therewith;
    an electrode array comprising a plurality of electrically conductive sense electrodes and at least one drive electrode, the sense and drive electrodes being spaced apart from the electrically conductive member by a gap;
    a stationary lower magnet disposed below the plurality of sense electrodes and the drive electrode, the lower magnet being configured and positioned to attract the upper magnet to a centered rest position thereabove;

a drive signal circuit configured to provide an electrical drive signal to the electrically conductive member through the drive electrode and the gap, and a capacitance measurement circuit operably coupled to the electrically conductive member and the sense electrodes, the circuit being configured to detect changes in capacitance occurring between the electrically conductive member and the sense electrodes when the upper magnet is moved from the centered rest position;

wherein the upper magnet is moveable by a user in respect of the lower magnet, the plurality of sense electrodes and the drive electrode disposed therebelow, and the lower magnet is further configured to exert a magnetic force on the upper magnet to return the upper magnet to the centered rest position when the upper magnet is moved from the centered rest position and then released by the user.

2. The input device of claim 1, wherein the upper magnet and the electrically conductive member are configured to slide along a principal axis.

3. The input device of claim 1, wherein the upper magnet and the electrically conductive member are further configured to tilt to at least one side of the principal axis.

4. The input device of claim 1, wherein each of the plurality of sense electrodes comprises a plurality of discrete electrode surfaces physically separated from one another in the electrode array, and where the discrete electrode surfaces are electrically connected to one another.

5. The input device of claim 1, wherein the electrically conductive member and the electrode array are configured such that substantially equal portions of surface area of the drive electrode remain disposed beneath the electrically conductive member as the upper magnet is moved over the electrode array.

6. The input device of claim 1, wherein the device is further configured to effect 5-way functionality.

7. The input device of claim 1, wherein the device is further configured to effect at least one of scrolling and clicking functionality.

8. The input device of claim 1, further comprising a button operably connected to the upper magnet.

9. The input device of claim 1, further comprising a button operably connected to the upper magnet, wherein the device is further configured to effect at least one of clicking and scrolling functionality when the button is depressed downwardly by a user.

10. The input device of claim 1, wherein the device is further configured to tilt to either side of the principal axis, and such tilting is employed to effect at least one operational function in the device.

11. The input device of claim 1, wherein a button is disposed over the upper magnet, the upper magnet has a hole disposed therethrough, and a plunger is disposed in the hole and operably connected to the button.

12. The input device of claim 11, wherein a depressable dome is disposed over the upper magnet.

13. The input device of claim 1, wherein the electrically conductive member has a deformable area formed or disposed therein or thereon at locations corresponding approximately to a bottom portion of the plunger configured to engage at least portions of the deformable area.

14. The input device of claim 1, further comprising a flexible membrane configured to impart at least one of leak-tightness, leak resistance, gas-tightness, gas resistance, vapor-tightness and vapor resistance to the device.

15. The input device of claim 1, wherein the capacitance measurement circuit is operably connected to a host processor.

16. The input device of claim 1, wherein the device is incorporated into and forms a portion of a mobile electronic device or a mouse.

17. The input device of claim 1, wherein the mobile electronic device is at least one of a laptop computer, a personal data assistant (PDA), a mobile telephone, a cellular telephone, a radio, an MP3 player, a transceiver, and a portable music player.

18. The input device of claim 1, wherein at least one of the drive signal circuit and the capacitance measurement circuit is incorporated into an integrated circuit.

19. The input device of claim 1, wherein the electrode array is disposed atop a substrate.

20. The input device of claim 19, wherein the substrate is at least one of a printed circuit board and a flexible printed circuit board.

21. The input device of claim 1, further comprising at least one mechanical biasing mechanism configured to exert a resisting force on the upper magnet, or a button, fascia or other intermediary member operably connected thereto, in response to a user moving the upper magnet, the button, the fascia or the intermediary member into contact therewith.

22. A method of using or making an input device, comprising:

providing a moveable upper magnet having an upper surface and a lower surface;

providing an electrically conductive member disposed below the lower surface of the upper magnet and moveable in conjunction therewith;

providing an electrode array comprising a plurality of electrically conductive sense electrodes and at least one drive electrode, the sense and drive electrodes being spaced apart from the electrically conductive member by a gap;

providing a stationary lower magnet disposed below the plurality of sense electrodes and the drive electrode, the lower magnet being configured and positioned to attract the upper magnet to a centered rest position thereabove;

providing a drive signal circuit configured to provide an electrical drive signal to the electrically conductive member through the drive electrode and the gap, and providing a capacitance measurement circuit operably coupled to the electrically conductive member and the sense electrodes, the circuit being configured to detect changes in capacitance occurring between the electrically conductive member and the sense electrodes when the upper magnet is moved from the centered rest position;

configuring the upper magnet, the electrically conductive member, the electrode array and the lower magnet such that the upper magnet is moveable by a user in respect of the lower magnet and the plurality of sense electrodes and the drive electrode disposed therebelow, and the lower magnet exerts a magnetic force on the upper magnet to return the upper magnet to the centered rest position when the upper magnet is moved from the centered rest position and then released by the user.

23. The method of claim 22, further comprising configuring the upper magnet and the electrically conductive member to slide along a principal axis.

24. The method of claim 23, further comprising configuring the upper magnet and the electrically conductive member to slide along the principal axis and tilt to at least one side of the principal axis.

25. The method of claim 22, wherein each of the plurality of sense electrodes comprises a plurality of discrete electrode surfaces physically separated from one another in the electrode array, and where the discrete electrode surfaces are electrically connected to one another.

* * * * *